US010709107B2

(12) United States Patent
Miller

(10) Patent No.: US 10,709,107 B2
(45) Date of Patent: Jul. 14, 2020

(54) ELEVATED PET FEEDER WITH SLOW FEED BOWL

(71) Applicant: Susan H. Miller, Morris, IL (US)

(72) Inventor: Susan H. Miller, Morris, IL (US)

(*) Notice: Subject to any disclaimer, the term of this patent is extended or adjusted under 35 U.S.C. 154(b) by 212 days.

(21) Appl. No.: 16/005,848

(22) Filed: Jun. 12, 2018

(65) Prior Publication Data
US 2018/0352782 A1 Dec. 13, 2018

Related U.S. Application Data

(60) Provisional application No. 62/518,253, filed on Jun. 12, 2017.

(51) Int. Cl.
A01K 5/01 (2006.01)
(52) U.S. Cl.
CPC .................. A01K 5/0114 (2013.01)
(58) Field of Classification Search
CPC .. A01K 5/0114; A01K 5/0142; A01K 5/0135; A01K 7/00
USPC .............. 119/61.53, 51.01, 51.5, 61.5, 61.56
See application file for complete search history.

(56) References Cited

U.S. PATENT DOCUMENTS

| D289,807 S | 5/1987 | Russell |
| 5,630,375 A * | 5/1997 | Mann ................... A01K 5/0114 |
| | | 119/51.03 |
| 6,557,489 B2 | 5/2003 | King |
| D770,099 S * | 10/2016 | Jones ........................ D30/129 |
| 10,064,385 B2 * | 9/2018 | Chylinski ............... A01K 5/01 |
| 2003/0106498 A1 | 6/2003 | Mersits et al. |
| 2005/0115508 A1 | 6/2005 | Little |
| 2010/0162961 A1 | 7/2010 | Hove et al. |

* cited by examiner

Primary Examiner — Yvonne R Abbott-Lewis
(74) Attorney, Agent, or Firm — Boudwin Intellectual Property; Daniel Boudwin

(57) ABSTRACT

A pet feeder for slowing food consumption with a height adjustable stand. The elevated pet feeder includes a bowl having an inner surface, an outer surface, a sidewall extending from a base of the bowl, and a cavity with an open upper end for receiving contents. The sidewall includes spaced markings each designating a different volume within the cavity. Further, an impediment extends from the center of the base of the bowl with a propeller removably secured to the impediment, such that the impediment and propeller in combination can slow food consumption. The elevated pet feeder includes a receptacle that receives the bowl. A stand extends from the receptacle and can adjust the height of the receptacle.

9 Claims, 2 Drawing Sheets

ELEVATED PET FEEDER WITH SLOW FEED BOWL

CROSS REFERENCE TO RELATED APPLICATIONS

This application claims the benefit of U.S. Provisional Application No. 62/518,253 filed on Jun. 12, 2017. The above identified patent application is herein incorporated by reference in its entirety to provide continuity of disclosure.

BACKGROUND OF THE INVENTION

The present invention relates to pets that consume food or water too quickly potentially leading to health problems. Some of these health problems include acid reflux, neck pain, arthritis, mega esophagus, gastric dilation-volvus and others. Most conventional elevated pet food bowls are fixed in height, which does not allow a petro use the elevated pet food bowl at multiple stages of growth. Further, even adjustable height elevated pet food bowls lack a mechanism to measure and slow the intake of food or water. Therefore, there exists a need for a pet food bowl that has adjustable elevation and provides a means to measure and slow the intake of food or water by a pet. In this way, the pet food bowl can minimize the risk of a pet becoming afflicted with health problems due to improper consumption of food and water.

Devices have been disclosed in the known art that relate to pet feeders. These include devices that have been patented and published in patent application publications. These devices generally relate to a pet bowl that fits into an elevated tabletop structure. These devices, however, fail to disclose a bowl having an impediment attached to the base of a bowl with a propeller removably secured to the impediment.

In light of the devices disclosed in the known art, it is submitted that the present invention substantially diverges in design elements from the prior art and consequently it is clear that there is a need in the art for an improvement to existing rail mounted table devices. In this regard the instant invention substantially fulfills these needs.

SUMMARY OF THE INVENTION

In view of the foregoing disadvantages inherent in the known types of feeding bowls now present in the prior art, the present invention provides a feeding bowl wherein the same can be utilized for providing convenience for the user when consuming food or water.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
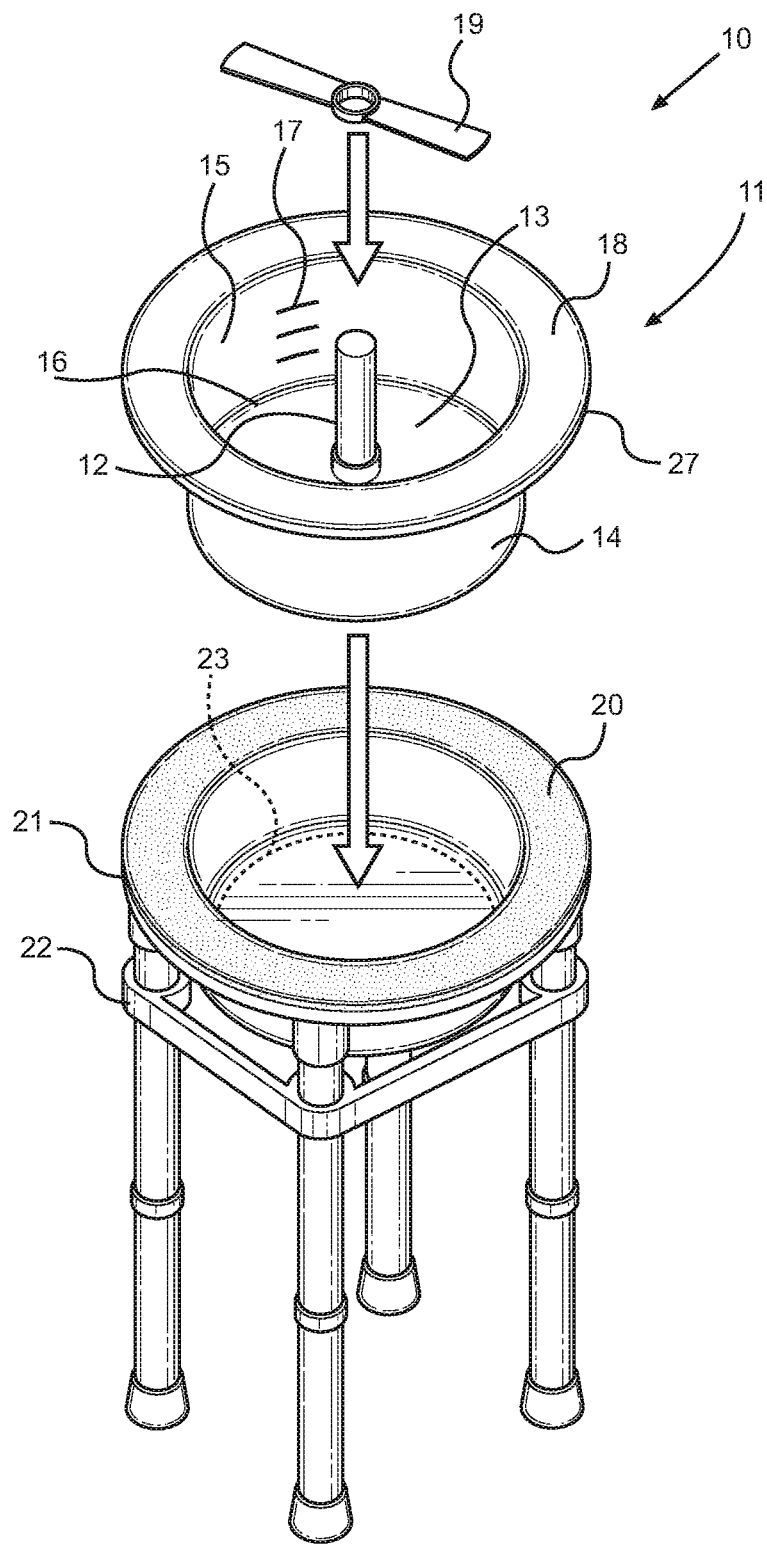
FIG. 1 shows an exploded view of the elevated pet feeder.

Reference is made herein to the attached drawings. Like reference numerals are used throughout the drawings to depict like or similar elements of the elevated pet feeder. The figures are intended for representative purposes only and should not be considered limiting in any respect.

Figure 2:
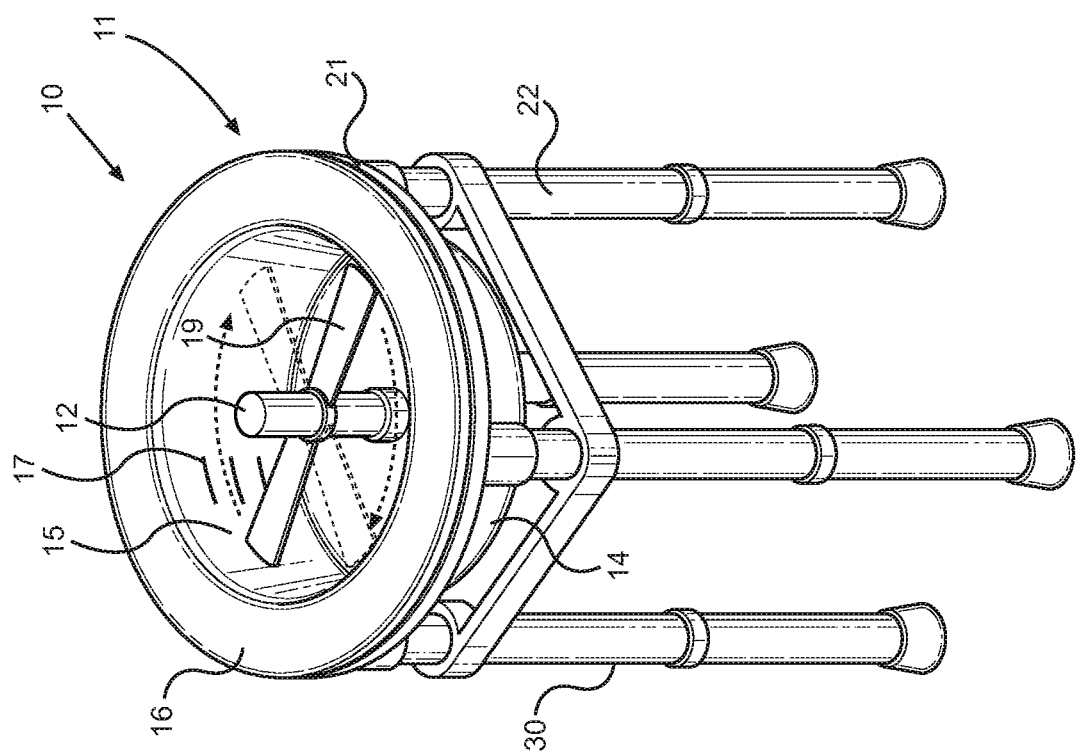
FIG. 2 shows a perspective view of the static propeller of the elevated pet feeder.

Referring now to FIGS. 1 and 2, there is shown an exploded view of the elevated pet feeder and a perspective view of a static propeller of the elevated pet feeder, respectively. The elevated pet feeder may be seen depicted generally by the number 10. The elevated pet feeder 10 includes a bowl 11 having an inner surface 13, an outer surface 14, a sidewall 15, and a cavity 16 with an open upper end 27 for receiving contents, such as food and water.

In FIGS. 1 and 2, the bowl 11 is circular and includes rounded edges. In this way there are no sharp edges on the bowl 11, thereby providing a safe environment for a pet to eat or drink. However, in other embodiments, the bowl 11 can be any suitable shape, and can be configured as an oval or square. The bowl 11 can be composed of any suitable material, such as stainless steel. The bowl 11 includes the sidewall 15 comprised of spaced markings each designating a different volume within the cavity 16 for measuring the amount of food or water in the bowl 11. The spaced markings consist of at least one groove gradation around the inner surface 13 which has indica marked showing a quantity measured in half or quarter p increments, but the increments can be any convenient metric measurement. When a quantity of food or water is placed in the bowl 11, filling the bowl 11 to one of the groove gradations displays the quantity in the bowl 11.

The bowl 11 is further comprised of a lip 18 that extends from a perimeter of the open upper rim 28. In the illustrated embodiment, the lip extends perpendicularly from the sidewall of the bowl. The lip 18 helps to reduce spillage of food or water and secures the bowl 11 to a receptacle 21.

The bowl further comprises an impediment 12 configured to restrict the amount of food or water consumed by its user. In the illustrated embodiment, the impediment 12 is conical in shape and extends from the base 29 of the bowl 11 with the height of the impediment 12 being proportional to an inside perimeter of the lip 18 and sufficient to rise above the level of food or water placed in the bowl 11. The circumference of the impediment 12 is suited to fit a propeller 19 having an aperture 32 for engagement with the impediment being removably secured to the impediment 12 and rotating about the impediment 12 in order to block access to specific sections of the food from its user, thereby slowing the rate that food is consumed. The propeller 19 further comprises two blades equidistant from each other and extending a suitable distance to freely rotate about the impediment 12, wherein the blades are manually rotated by the user while eating or drinking therefrom. The propeller 19 is removable from the impediment 12 in order to be cleaned or replaced if damaged.

The elevated pet feeder further comprises the receptacle 21 with a stand 22 extending therefrom wherein the stand 22 is configured to adjust the height of the receptacle 21 and the receptacle is configured to receive the bowl 11. The receptacle 21 comprises a cutout region 23 with an upper rim 28 configured to receive the bowl 11. The cutout region 23 can be any suitable shape, and can be configured as an oval, square or rectangle in order to fit the size of the bowl 11. In some embodiments, the upper rim 28 has a magnetic strip 20 attached to the upper rim 28 in order to secure the bowl 11 to the receptacle 21 in a static position. In the illustrated embodiment the lip 18 of the bowl 11 comprises the same dimensions as the upper rim, wherein a lower surface of the lip 18 is configured to rest flush against an upper surface of the upper rim 28.

Figure 3:
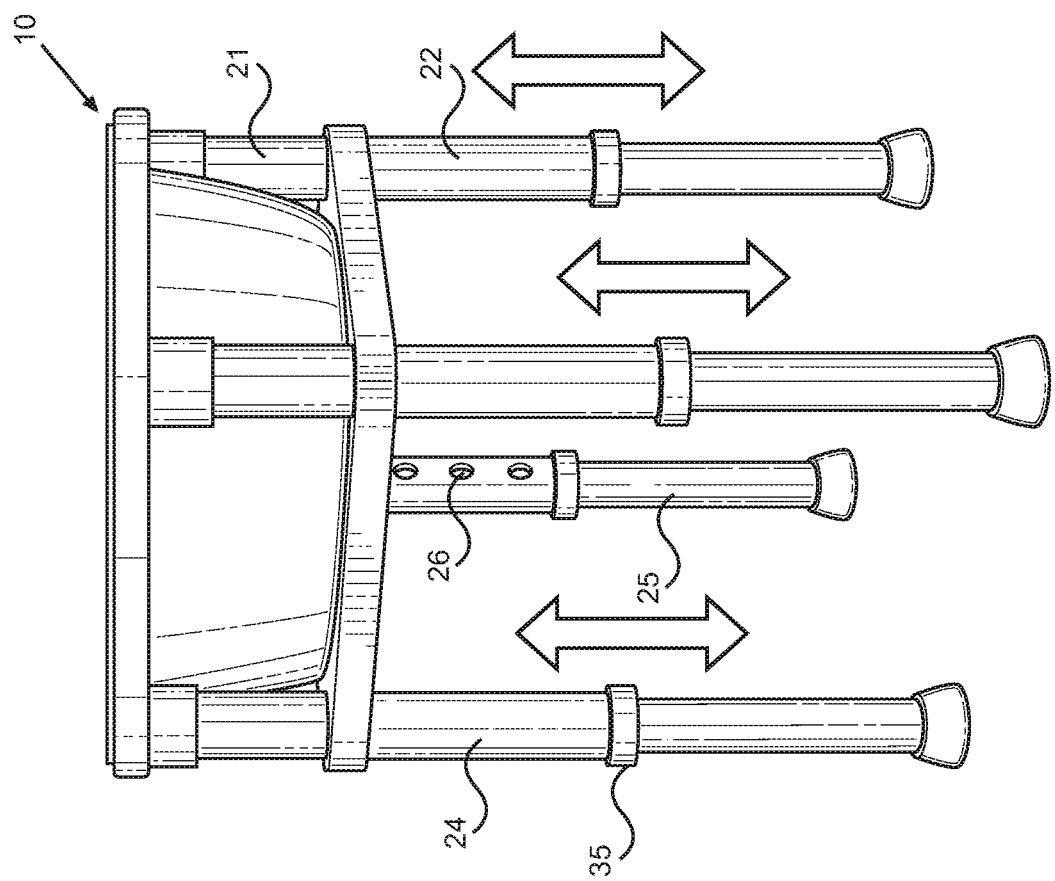
FIG. 3 shows a perspective view of the elevated pet feeder.

Referring now to FIG. 3, there is shown a perspective view of the elevated pet feeder. In the illustrated embodiment of the elevated pet feeder 10, the stand 22 comprises a pair of legs 30 on each side of the cutout region 23 wherein each of the legs 30 has an adjustable first rod member 24 and a second rod member 25 slidably received within a hollow interior 31 of the adjustable first rod member 24. The second rod member 25 is movable between a retracted configuration and an extended configuration. In the retracted configuration, the second rod member 25 is disposed inside the adjustable first rod 24 and in the extended configuration the second rod member 25 is disposed outside the adjustable first rod 24, thereby adjusting the length of the legs. The adjustable first rod 24 and the second rod 25 each have a series of apertures 26 adapted to receive a fastener 35 through a pair of aligned apertures 26, such that the fastener 35 disposed through an aperture 26 of the second rod 25 is configured to pass through an aperture 26 of the adjustable first rod 24 when aligned, thereby securing the legs 30 in a static position.

In the illustrated embodiment, the legs 30 are made from stainless steel, tubular light-weight plastic, aluminum or other structural materials. Similarly, in the illustrated embodiment, the cutout region 23 is fabricated of some plastic or metal suitable to hold the receptacle 21.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An elevated pet feeder, comprising:
   a bowl having an inner surface, an outer surface, a sidewall, and a cavity with an open upper end for receiving contents;
   wherein the sidewall includes spaced markings each designating a different volume within the cavity;
   an impediment attached to a base of the bowl;
   a propeller removably secured to the inpediment;
   a receptacle configured to receive the bowl with a stand extending therefrom wherein the stand is configured to adjust the height of the receptacle.

2. The elevated pet feeder of claim 1, wherein the bowl is formed of stainless steel or another suitable material and has a lip extending from a perimeter of the open upperend.

3. The elevated pet feeder of claim 1, wherein the bowl is configured to have the same shape as the receptacle so that the bowl fits within a close tolerance of the receptacle and is removably mounted on the base of the receptacle.

4. The elevated pet feeder of claim 1, wherein the impediment has a conical shape and is attached to the base of the bowl.

5. The elevated pet feeder of claim 1, wherein the propeller comprises an aperture for engagement with the impediment with the propeller configured to rotate around the impediment.

6. The elevated pet feeder of claim 5, wherein the stand comprises an adjustable first rod member and a second rod member slidably received within a hollow interior of the adjustable first rod member, wherein the second rod member is movable between a retracted configuration inside the adjustable first rod and an extended configuration outside the adjustable first rod.

7. The elevated pet feeder of claim the adjustable first rod and the second rod each have a series of apertures adapted to receive a fastener through a pair of aligned apertures, such that the fastener disposed through an aperture of the second rod is configured to pass through an aperture of the adjustable first rod when aligned.

8. The receptacle of claim 5, wherein the base further comprises a magnetic stripadapted to attach to a top portion of the base and receive a bottom portion of the bowl to secure the bowl in a stationary position.

9. The receptacle of claim 5, wherein the base includes a cutout region shaped to fit the bowl.

* * * * *